United States Patent
Helbing et al.

(10) Patent No.: US 7,072,113 B2
(45) Date of Patent: Jul. 4, 2006

(54) WAVELENGTH SELECTIVE SWITCHING DEVICE AND METHOD FOR SELECTIVELY TRANSMITTING OPTICAL SIGNALS BASED ON WAVELENGTH

(76) Inventors: Rene Helbing, 848 Sycamore Dr., Palo Alto, CA (US) 94303; Charles D. Hoke, 341 O'Connor St., Menlo Park, CA (US) 94025; Ken Nishimura, 5351 Diana Common, Fremont, CA (US) 94555

( * ) Notice: Subject to any disclaimer, the term of this patent is extended or adjusted under 35 U.S.C. 154(b) by 0 days.

(21) Appl. No.: 10/680,647

(22) Filed: Oct. 7, 2003

(65) Prior Publication Data
US 2005/0073749 A1    Apr. 7, 2005

(51) Int. Cl.
    *G02B 5/30*    (2006.01)
(52) U.S. Cl. ............... 359/566; 359/572; 359/615; 359/494; 359/496; 359/484; 398/48; 398/68; 398/79; 398/84
(58) Field of Classification Search .............. None
    See application file for complete search history.

(56) References Cited

U.S. PATENT DOCUMENTS

| | | | | |
|---|---|---|---|---|
| 4,408,329 A | * | 10/1983 | Ferguson | 372/21 |
| 5,111,321 A | * | 5/1992 | Patel | 349/198 |
| 5,251,058 A | * | 10/1993 | MacArthur | 359/249 |
| 5,267,078 A | * | 11/1993 | Shiraishi et al. | 359/282 |
| 6,275,623 B1 | * | 8/2001 | Brophy et al. | 385/14 |
| 6,498,872 B1 | * | 12/2002 | Bouevitch et al. | 385/24 |
| 6,801,310 B1 | * | 10/2004 | Kewitsch et al. | 356/328 |
| 2002/0176658 A1 | | 11/2002 | Prohaska | |
| 2004/0008932 A1 | * | 1/2004 | Peng et al. | 385/27 |
| 2005/0036202 A1 | * | 2/2005 | Cohen et al. | 359/495 |

FOREIGN PATENT DOCUMENTS

CA    2342719 A1 *  5/2002

\* cited by examiner

*Primary Examiner*—Fayez G. Assaf

(57) ABSTRACT

A wavelength selective switching device and method for selectively transmitting optical signals based on wavelength utilizes diffraction to spatially separate the optical signals of different wavelengths such that the optical signal of a selected wavelength can be selectively transmitted. The wavelength selective switching device selectively rotates the polarization components of the optical signals such that the polarization states of the polarization components are the same in both incoming and outgoing directions at the diffraction grating. Thus, a diffraction grating with a high grating line frequency (e.g. greater than 900 grating lines per mm for signals in the 1550 nm wavelength range) can be used for diffracting the polarization components of the optical signals in both the incoming and outgoing directions.

13 Claims, 7 Drawing Sheets

WAVELENGTH SELECTIVE SWITCHING DEVICE AND METHOD FOR SELECTIVELY TRANSMITTING OPTICAL SIGNALS BASED ON WAVELENGTH

FIELD OF THE INVENTION

The invention relates generally to optical devices, and more particularly to an optical device and method for selectively transmitting optical signals based on wavelength.

BACKGROUND OF THE INVENTION

Wavelength selective switching devices are important components in optical communications systems. As an example, a wavelength selective switching device may be used to selectively transmit only optical signals of a selected wavelength, and thus, to block the other optical signals of different wavelengths. Such a wavelength selective switching device is commonly referred to as a blocking filter.

Typically, a wavelength selective switching device includes two major functional parts, a demultiplexer and an active switching or attenuating element. The demultiplexer spatially separates the different wavelength optical signals, while the active element selectively routes the optical signals based on wavelength. For a high number of accessible wavelengths or channels, the preferred technology choice is a diffraction grating and free space optics for the demultiplexer, and a liquid crystal switching array for the active element because of their simple construction, ease of fabrication and lack of moving parts. In such a wavelength selective switching device, the liquid crystal switching array may be used in either a transmissive or reflective configuration. However, the reflective configuration is preferred to minimize the size of the wavelength selective switching device. In a conventional reflective configuration, optical signals are twice diffracted by the same diffraction grating, once in an incoming direction toward the liquid crystal switching array and another in an outgoing direction away from the array. For a selected wavelength, the polarization state of the optical signals differs in the incoming direction from the polarization state in the outgoing direction.

The physical size of any optical device that uses a diffraction grating for spatial separation of optical signals based on wavelength is related to the number of accessible channels. As the number of channels is increased, more optical signals of different wavelengths have to be dispersed in space. Thus, the physical size of the device is increased. However, the size of the device also depends on the optical properties of the diffraction grating. With increasing grating line frequency, i.e., the number of grating lines per unit of length, the angular dispersion of the device increases, and therefore, the required distance between the diffraction grating and the switching array to obtain sufficient spatial separation decreases. However, diffraction gratings with high grating line frequency (e.g. greater than 900 grating lines per mm for optical signals in the 1550 nm wavelength range) are only efficient for one polarization state, and thus cannot be used in a wavelength selective switching device with a liquid crystal switching array in a conventional reflective configuration.

In view of this concern, there is a need for a wavelength selective switching device and method for selectively transmitting optical signals based on wavelength that can utilize a diffraction grating with a high grating line frequency.

SUMMARY OF THE INVENTION

A wavelength selective switching device and method for selectively transmitting optical signals based on wavelength utilizes diffraction to spatially separate the optical signals of different wavelengths such that the optical signal of a selected wavelength can be selectively transmitted. The wavelength selective switching device selectively rotates the polarization components of the optical signals such that the polarization states of the polarization components are the same in both incoming and outgoing directions at the diffraction grating. Thus, a diffraction grating with a high grating line frequency (e.g. greater than 900 grating lines per mm for signals in the 1550 nm wavelength range) can be used for diffracting the polarization components of the optical signals in both the incoming and outgoing directions. The use of such a diffraction grating allows the size of the device to be reduced.

A wavelength selective switching device in accordance with an embodiment of the invention comprises an optics system, an optical unit, a diffraction grating and an active optical element. The optics system includes an input to receive optical signals in an incoming direction and an output to selectively transmit a selected optical signal in an outgoing direction. The optics system is configured to selectively rotate one of the polarization components of each of the optical signals in the incoming direction to a first polarization state, e.g., the P polarization state.

The active optical element of the device is configured to selectively convert the polarization components of the selected optical signal from the first polarization state to a second polarization state, e.g., the S polarization state. The optical unit is configured to laterally displace and rotate the polarization components of the selected optical signal such that the polarization components of the selected optical signal in the outgoing direction are in the first polarization state.

The diffraction grating of the device is positioned between the optics system and the optical unit to diffract the polarization components of the selected optical signal in both the incoming and outgoing directions. Due to the optical unit, the polarization components of the selected optical signal are in the same polarization state, i.e., the first polarization state, for both the incoming and outgoing directions at the diffraction grating.

A method for transmitting a selected optical signal in accordance with an embodiment of the invention comprises receiving optical signals, selectively rotating polarization components of the optical signals to the first polarization state, diffracting the polarization components of the optical signals in the first polarization state to spatially separate the polarization components, selectively converting the polarization components of the selected optical signal from the first polarization state to the second polarization state, rotating the polarization components of the selected optical signal from the second polarization state back to the first polarization state, diffracting the polarization components of the selected optical signal in the first polarization state in the outgoing direction and outputting the polarization components of the selected optical signal.

Other aspects and advantages of the present invention will become apparent from the following detailed description, taken in conjunction with the accompanying drawings, illustrated by way of example of the principles of the invention.

DETAILED DESCRIPTION

Figure 1:
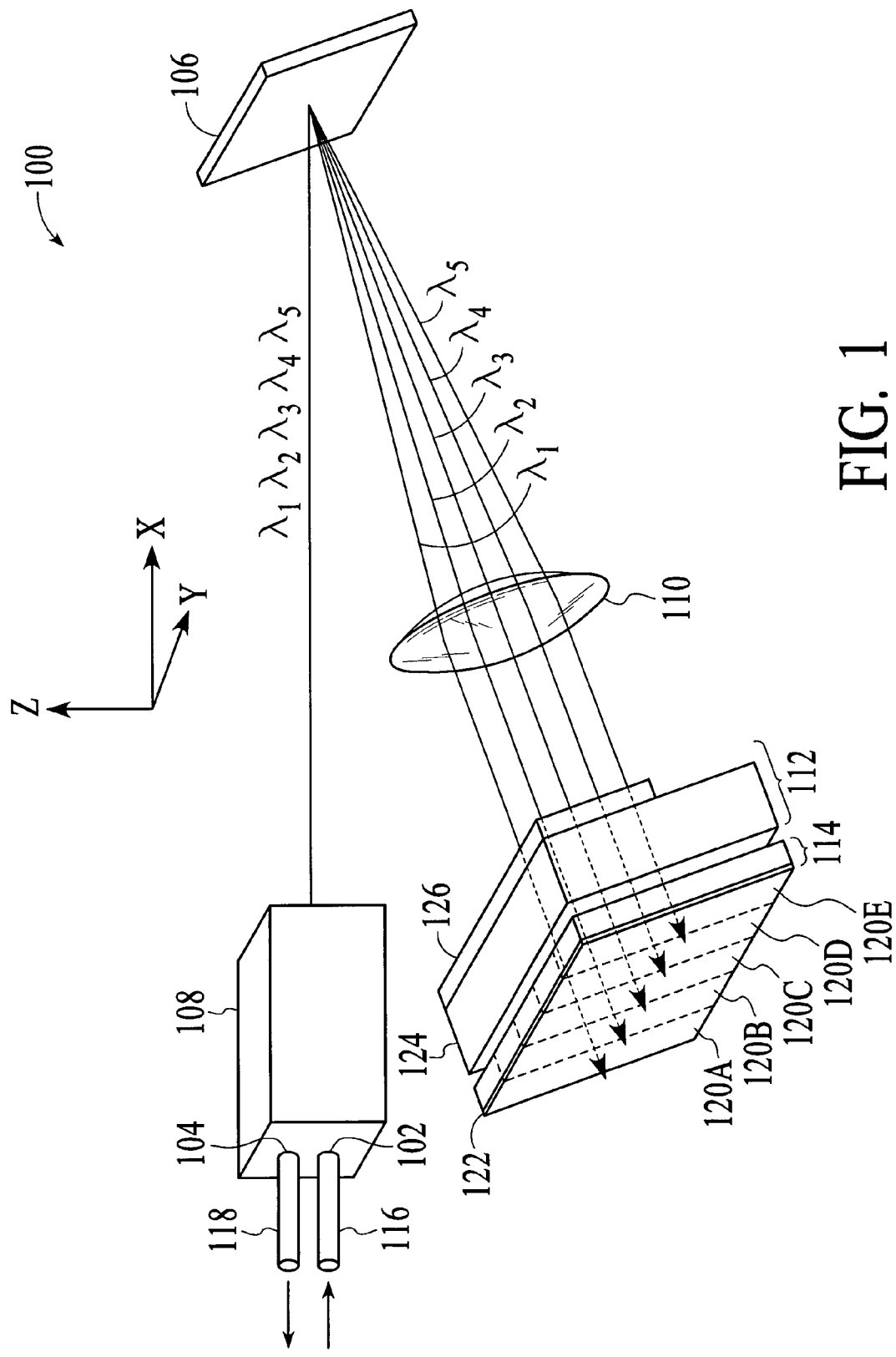
FIG. 1 is a perspective view of a wavelength selective switching device in accordance with an embodiment of the present invention.

With reference to FIG. 1, a perspective view of a wavelength selective switching device 100 in accordance with an embodiment of the invention is shown. The wavelength selective switching device 100 selectively transmits a single-wavelength optical signal of a wavelength division multiplexed (WDM) optical signal received at an input 102 of the device to the output 104 of the device, depending on the wavelength of the single-wavelength optical signal. In addition, the wavelength selective switching device 100 uses a diffraction grating 106 with a high grating line frequency (e.g. greater than 900 grating lines per mm for optical signals in the 1550 nm wavelength range). The use of such a diffraction grating allows the wavelength selective switching device 100 to provide more accessible wavelengths, i.e., channels, without significantly increasing the physical size of the device.

As shown in FIG. 1, the wavelength selective switching device 100 includes a front-end optics system 108, the diffraction grating 106, a lens 110, an intermediate optical unit 112 and a controllable switching array 114. The front-end optics system 108 includes the input 102 to receive a WDM optical signal comprising single-wavelength optical signals of different wavelengths from an input optical fiber 116 and the output 104 to selectively transmit the optical signal of the selected wavelength to an output optical fiber 118. Depending on the selected wavelength, an optical signal received at the input 102 is either routed to the output 104 or returned to the input 102, as described in more detail below. Thus, the wavelength selective switching device 100 can selectively transmit only an optical signal of a particular wavelength from the input optical fiber 102 to the output optical fiber 104. The wavelength selection can be changed using the controllable switching array 114. The wavelength selective switching device 100, therefore, functions as a configurable blocking filter.

Figure 2:
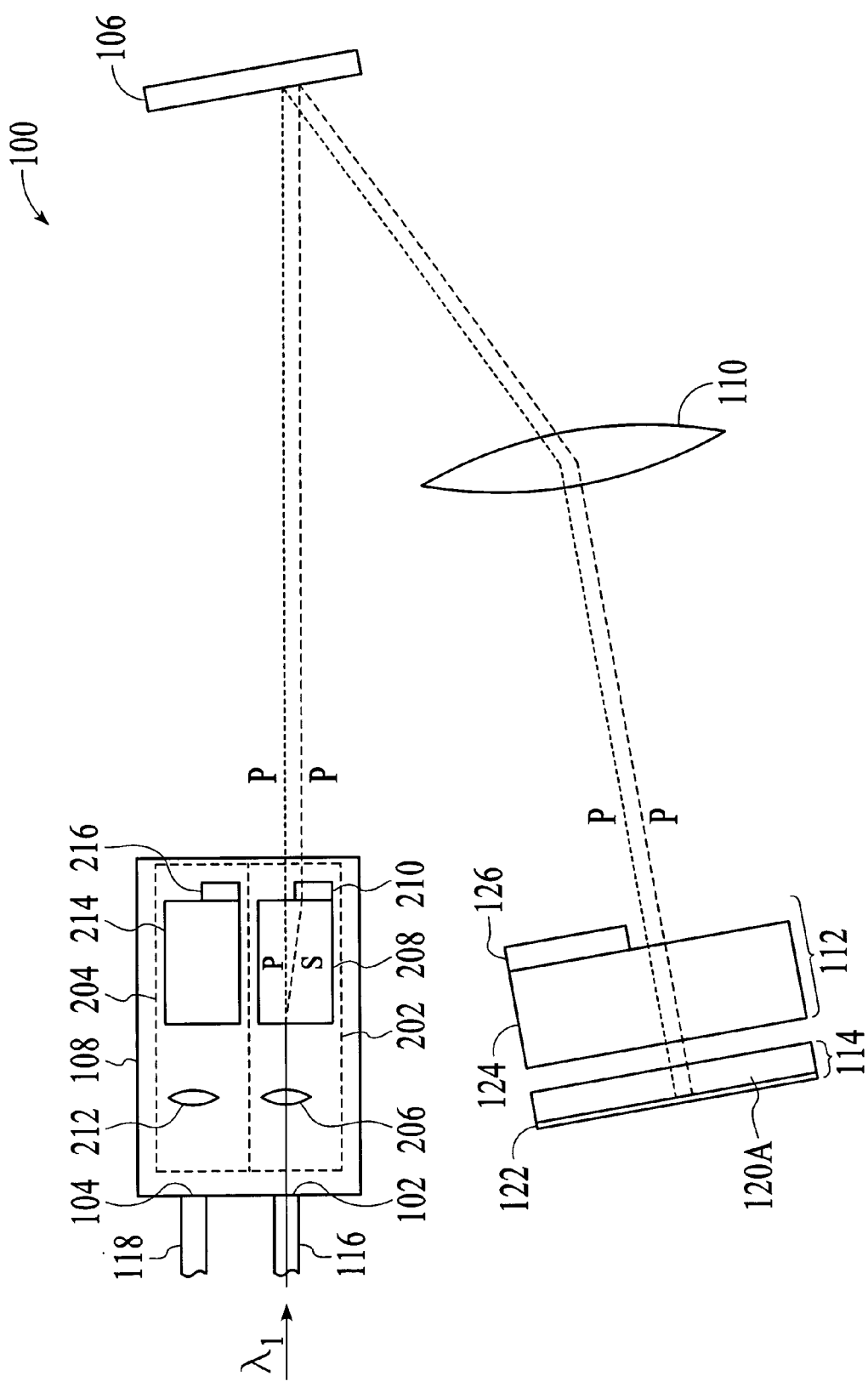
FIG. 2 is a side view of the wavelength selective switching device of FIG. 1, illustrating the optical paths in the incoming direction of the polarization components of all single-wavelength optical signals.
Figure 3A:
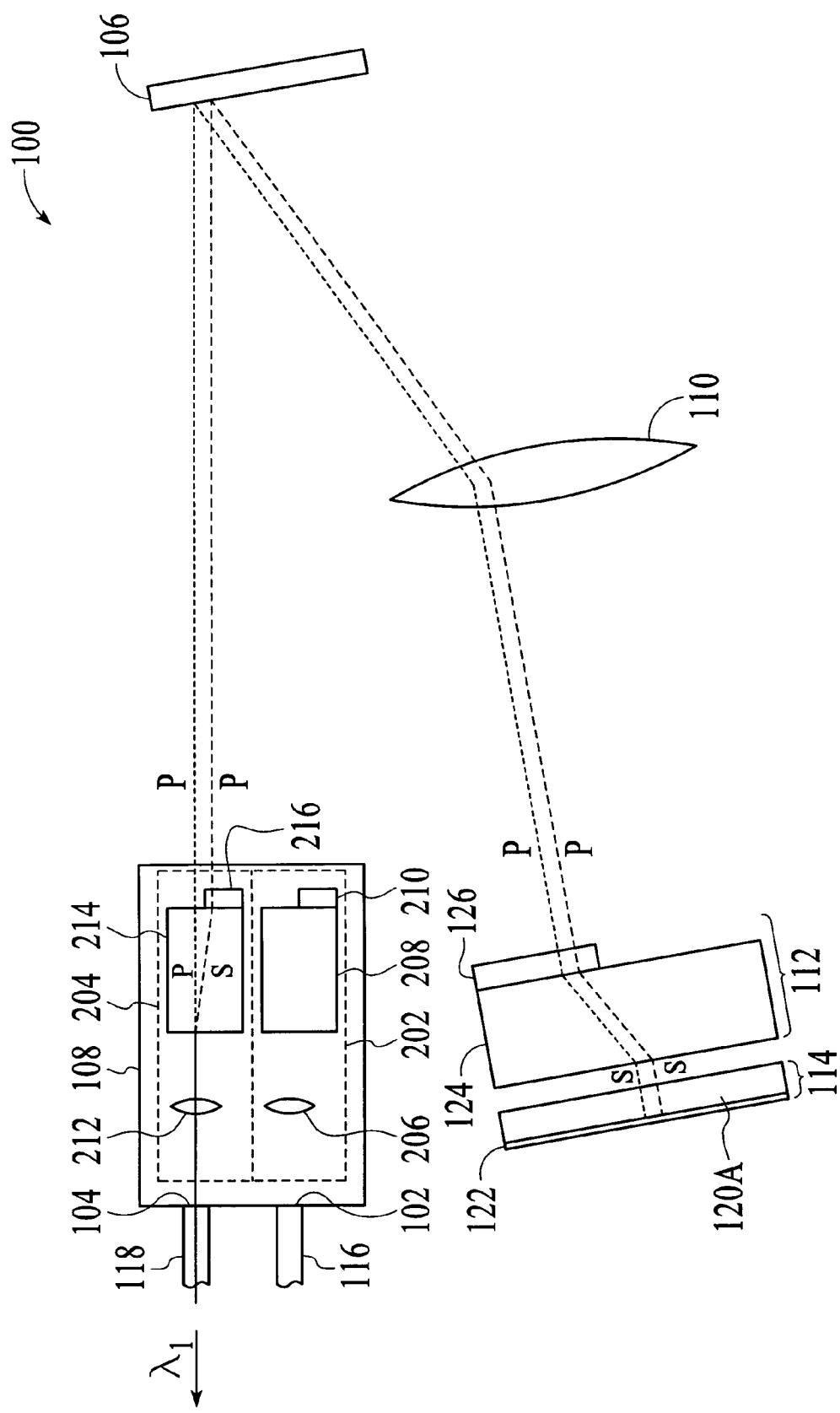
FIG. 3A is a side view of the wavelength selective switching device of FIG. 1, illustrating the optical paths in the outgoing direction of the polarization components of a single-wavelength optical signal of a selected wavelength.
Figure 3B:
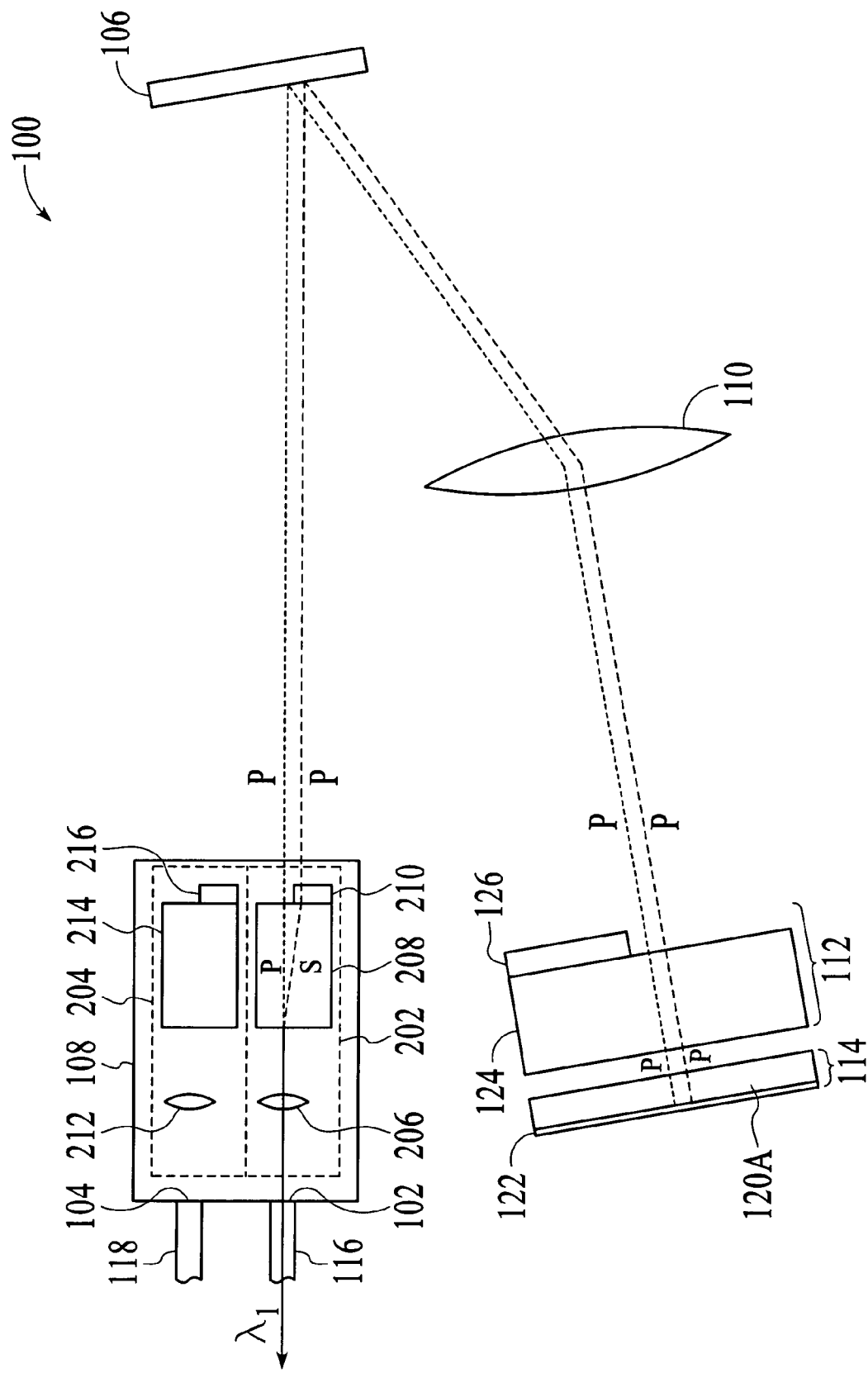
FIG. 3B is a side view of the wavelength selective switching device of FIG. 1, illustrating the optical paths in the outgoing direction of the polarization components of single-wavelength optical signals of non-selected wavelengths.

In FIGS. 2, 3A and 3B, a side view of the wavelength selective switching device 100 is shown. As used herein, an incoming direction is the direction from the input optical fiber 116 to the controllable switching array 114, and an outgoing direction is the direction from the controllable switching array 114 to the input optical fiber 116 or the output optical fiber 118. FIG. 2 illustrates the optical paths of the polarization components in the incoming direction for all optical signals, regardless of wavelength. FIG. 3A illustrates the optical paths of the polarization components in the outgoing direction for the single-wavelength optical signal of a selected wavelength. FIG. 3B illustrates the optical paths of the polarization components in the outgoing direction for the single-wavelength optical signals of non-selected wavelengths.

As shown in FIGS. 2, 3A and 3B, the front-end optics system includes an input optical unit 202 and an output optical unit 204. The input optical unit 202 is composed of a lens 206, a walk-off crystal 208 and a half-wave plate 210. The lens 206 is positioned between the input optical fiber 116 and the walk-off crystal 208 to focus the optical signals received from the input optical fiber. The walk-off crystal 208 is positioned between the lens 206 and the half-wave plate 210. The walk-off crystal 208 is orientated to spatially displace S polarization components of optical signals, spatially separating the orthogonal S and P polarization components of the optical signals into parallel parts separated from one another in the z direction, as illustrated in FIG. 2. The half-wave plate 210 is positioned relative to the walk-off crystal 208 such that only the S polarization components are received by the half-wave plate 210. The S polarization components are orthogonally rotated to the P polarization state by the half-wave plate 210. Consequently, both polarization components of the optical signals are set to the P polarization state by the input optical unit 202. The input optical unit 202 is optically aligned with the diffraction grating 106 such that the polarization components output by the input optical unit 202 are incident on the diffraction grating.

Similar to the input optical unit 202, the output optical unit 204 is composed of a lens 212, a walk-off crystal 214 and a half-wave plate 216. As described below, the output optical unit 204 only receives the polarization components of an optical signal of a selected wavelength. In addition, both polarization components of the optical signal are in the P polarization state when they reach the output optical unit 204. The half-wave plate 216 is positioned relative to the walk-off crystal 214 such that the polarization component that was rotated by the half-wave plate 210 is incident on the walk-off crystal 214 via the half-wave plate 216, while the other polarization component is directly incident on the walk-off crystal 214. The half-wave plate 216 rotates the polarization of the polarization component incident thereon to the S polarization state. The walk-off crystal 214 is orientated such that the S polarization component is spatially displaced toward the P polarization component, as illustrated in FIG. 3A. Consequently, the S and P polarization components are spatially combined by the walk-off crystal 214. The lens 212 is positioned between the walk-off crystal 214 and the output optical fiber 118 to focus the combined S and P polarization components onto the end of the output optical fiber as an output optical signal.

As shown in FIGS. 1, 2, 3A and 3B, the diffraction grating 106 is positioned to diffract incident polarization components between the front-end optics system 108 and the controllable switching array 114. The diffraction grating 106 may be a holographic grating or any other suitable diffraction grating. As described above, the diffraction grating 106 is a diffraction grating with a high grating line frequency, e.g., greater than 900 lines per mm. In contrast to conventional wavelength selective switching devices, the wavelength selective switching device 100 is designed such that incident polarization components in both the incoming and outgoing directions at the diffraction grating 106 are orientated in the same polarization state. This allows the wavelength selective switching device 100 to use a diffraction grating 106 with a high grating line frequency. A diffraction grating with a high grating line frequency is only efficient for one polarization state.

In the illustrated embodiment, the diffraction grating 106 is shown as a reflective type grating. In other embodiments, the diffraction grating 106 may be a transmissive type grating. However, a reflective type grating reduces the physical size of the wavelength selective switching device 100.

Due to the diffractive property of the diffraction grating 106, incident polarization components of different wavelengths are diffracted at different angles of diffraction. As an example, polarization components of wavelength $\lambda_1$, $\lambda_2$, $\lambda_3$, $\lambda_4$ and $\lambda_5$ from the front-end optics system 108 are diffracted at different angles of diffraction, as illustrated in FIG. 1. Thus, polarization components of different wavelengths are spatially separated at the controllable switching array 114. This enables the controllable switching array 114 to selectively manipulate the polarization components of the single wavelength optical signal of a desired wavelength so that the single wavelength signal of the desired wavelength is transmitted to the output optical fiber 118.

The lens 110 of the wavelength selective switching device 100 is positioned between the diffraction grating 106 and the controllable switching array 114. In the incoming direction, the lens 110 collimates the diffracted polarization components of different wavelengths diverging from the diffraction grating 106 so that the polarization components propagate parallel to one another towards the controllable switching array 114. In the outgoing direction, the lens 110 converges the polarization components that have been reflected by the controllable switching array 114 on a common area of the diffraction grating 106.

The controllable switching array 114 of the wavelength selective switching device 100 includes pixels 120A, 120B, 120C, 120D and 120E, as shown in FIG. 1. In order to simplify the drawing, only five pixels are shown, which represent a small fraction of pixels in a real wavelength selective switching device. The pixels 120A–120E include electrically controllable birefringent (ECB) material, such as liquid crystal or lithium niobate. The optical property of the ECB material can be switched between a passive state and an active state by selectively applying an electric field. Thus, the pixels 120A–120E can be individually switched between the two states by selective application of a drive voltage. When the ECB material of a pixel is in its passive state, the pixel does not change the polarization components reflected by the pixel. However, when the ECB material of a pixel is switched to the active state, that pixel becomes optically active, and functions as a quarter-wave plate on the polarization components incident thereon.

The back surface 122 of the controllable switching array 114 is a reflective surface that reflects the polarization components incident thereon back to the diffraction grating 106. Thus, each pair of polarization components of an optical signal propagates twice through one of the pixels 120A–120E of the controllable switching array 114. This roundtrip does not have any effect on the polarization components when the ECB material of the pixel is in the passive state. However, when the ECB material of the pixel is switched to the active state, the roundtrip through the pixel has the same effect on the polarization components as a half-wave plate. Thus, an active pixel of the controllable switching array 114 converts a P polarization component in the incoming direction into an S polarization component in the outgoing direction, as described in more detail below.

The intermediate optical unit 112 of the wavelength selective switching device 100 is situated between the lens 110 and the controllable switching array 113. In this embodiment, the intermediate optical unit 112 includes a walk-off crystal 124 and a half-wave plate 126. The walk-off crystal 124 is orientated such that only S polarization components are displaced. In the incoming direction toward the controllable switching array 114, both of the polarization components of an optical signal are in the P polarization state as the polarization components propagate through the walk-off crystal 124. Thus, in the incoming direction, the polarization components are not affected by the walk-off crystal 124. However, in the outgoing direction from the controllable switching array 114, the polarization components incident on a pixel switched to the active state are converted to S polarization components. Thus, in the outgoing direction, both of the polarization components are displaced by the walk-off crystal 126, as illustrated in FIG. 3A.

The half-wave plate 126 of the intermediate optical unit 112 is positioned such that polarization components in the incoming direction do not propagate through the half-wave plate. However, the half-wave plate 126 is positioned such that, in the outgoing direction, the polarization components that have been displaced by the walk-off crystal 124 propagate through the half-wave plate 126, while the polarization components that have not displaced do not propagate through the half-wave plate 126. Since only the polarization components of a selected wavelength are converted to S polarization components by one of the pixels 120A–120E of the controllable switching array 114 and then displaced by the walk-off crystal 124, the half-wave plate 126 operates only on the polarization components of a selected wavelength, which are rotated to the P polarization state by the half-wave plate 126.

The operation of the wavelength selective switching device 100 on the polarization components of a single-wavelength optical signal is now described. As stated above, FIG. 2 illustrates the paths in the incoming direction of the polarization components of all single-wavelength optical signals. FIG. 3A illustrates the paths in the outgoing direction of the polarization components of the selected single-wavelength optical signal. Thus, in FIG. 3A, the polarization components are reflected from an active pixel of the controllable switching array 114. FIG. 3B illustrates the paths in the outgoing direction of the polarization components of the non-selected single-wavelength optical signals. Thus, in FIG. 3B, the polarization components are reflected from inactive pixels of the controllable switching array 114. An optical signal of a particular wavelength, e.g., wavelength of $\lambda_1$, is received by the wavelength selective switching device 100 at the input port 102 from the input optical fiber 116, as illustrated in FIG. 2. The optical signal is then focused by the lens 206 of the input optical unit 202 and transmitted to the walk-off crystal 208. As the optical signal propagates through the walk-off crystal 208, the S polarization component of the optical signal is selectively displaced, spatially separating the two orthogonal S and P polarization components of the optical signal. The S polarization component is then orthogonally rotated by the half-wave plate 210, converting the S polarization component to a P polarization component. Thus, both polarization components of the optical signal are now in the P polarization state.

The two P polarization components are then diffracted at a particular diffraction angle by the diffraction grating 106 such that the diffracted polarization components propagate on optical paths toward a targeted pixel of the controllable switching array 112. The diffraction angle determines the targeted pixel for the diffracted polarization components. The diffraction angle depends on the wavelength of the polarization components. Thus, the targeted pixel of the controllable switching array 112 corresponds to the wavelength of the diffracted polarization components. If the optical paths of the diffracted polarization components are not normal to the controllable switching array 114, the optical paths are changed to a direction normal to the array by the lens 110. In FIG. 2, the diffracted polarization components are directed to the pixel 120A of the controllable switching array 114 since that pixel corresponds to the wavelength $\lambda_1$.

After the lens 110, the polarization components are transmitted through the walk-off crystal 124 of the intermediate optical unit 112. Since the polarization components are in the P polarization state, the polarization components are transmitted through the walk-off crystal 124 without being affected by the walk-off crystal. Thus, the optical paths of the polarization components are not changed by the walk-off crystal 112.

If the single wavelength optical signal of wavelength $\lambda_1$ has been selected to be transmitted to the output optical fiber 118, the ECB material of the targeted pixel 120A is switched to the active state so that the pixel functions as a quarter-wave plate. In this state, the P polarization components are twice retarded by the activated pixel 120A. As the P polarization components propagate through the pixel 120A, the linear P polarization components are converted into circular polarization components by the activated ECB material of the pixel 120A. The circular polarization components are then reflected off the reflective surface 122, which changes the handedness of the circular polarization components. As the reflected circular polarization components again propagate through the pixel 120A, the circular polarization components are converted back to linear polarization components. However, due to change in handedness, the original P polarization components are converted to S polarization components.

In the outgoing direction, as illustrated in FIG. 3A, the converted S polarization components are again transmitted through the walk-off crystal 124 of the intermediate optical unit 112. However, since the polarization components have been converted to S polarization components by the pixel 120A of the controllable switching array 114 in the active state, the S polarization components are laterally displaced by the walk-off crystal 124 so that the polarization components are incident on the half-wave plate 126. Consequently, the polarization components are transmitted through the half-wave plate 126, where the polarization components are orthogonally rotated such that they are converted back to P polarization components.

The P polarization components are then transmitted to the diffraction grating 106 via the lens 110. At the diffraction grating 106, the P polarization components are diffracted toward the output optical unit 204 due to the displacement caused by the walk-off crystal 124 of the intermediate optical unit 112. One of the diffracted P polarization components is transmitted through the half-wave plate 216 of the output optical unit 204 and then the walk-off crystal 214, while the other diffracted P polarization components is transmitted directly through the walk-off crystal 214. The polarization component transmitted through the half-wave plate 216 is orthogonally rotated to the S polarization state, converting that polarization component to the S polarization component. The converted S polarization component is then displaced toward the other polarization component by the walk-off crystal 214. Thus, the S and P polarization components are spatially combined by the walk-off crystal 214. The combined polarization components are then focused onto the output optical fiber 118 by the lens 212 and transmitted through the output optical fiber as the output optical signal.

However, if the single wavelength optical signal of wavelength $\lambda_1$ has not been selected to be transmitted to the output optical fiber 118, the ECB material of the targeted pixel 120A is in the passive state. In this state, the polarization state of the polarization components is not altered by the pixel 120A. Thus, the polarization components emerge from the pixel in the same polarization state, i.e., the P polarization state, as illustrated in FIG. 3B. In the P polarization state, the polarization components are transmitted through the walk-off crystal 124 without being displaced, and thus, are not transmitted through the half-wave plate 126. The P polarization components are then transmitted to the diffraction grating 106 via the lens 110 on the same optical paths as in the incoming direction. At the diffraction grating 106, the polarization components are diffracted back to the input optical unit 202.

One of the diffracted P polarization components is transmitted through the half-wave plate 210 of the output optical unit 202 and then the walk-off crystal 208, while the other diffracted S polarization components is transmitted directly through the walk-off crystal 208. The polarization component transmitted through the half-wave plate 210 is orthogonally rotated to the S polarization state, converting that polarization component to the S polarization component. The converted S polarization component is then displaced toward the other polarization component by the walk-off crystal 208. Thus, the S and P polarization components are spatially combined by the walk-off crystal 208. The combined polarization components are then focused onto the input optical fiber 116 by the lens 206. Therefore, the polarization components of a non-selected wavelength follow the same optical paths in the outgoing direction as in the incoming direction.

The optical signal returned to the input optical fiber 116 by the pixel 120A of the controllable switching array 114 in the active state may or may not be desired. If this signal is not desired, an optical isolator (not shown) may be positioned ahead of the input optical fiber 116 to block the returned signal. However, if the signal is desired, an optical circulator (not shown) may be positioned ahead of the input optical fiber 116 to receive the returned signal, which can be used to monitor activity.

Figure 4:
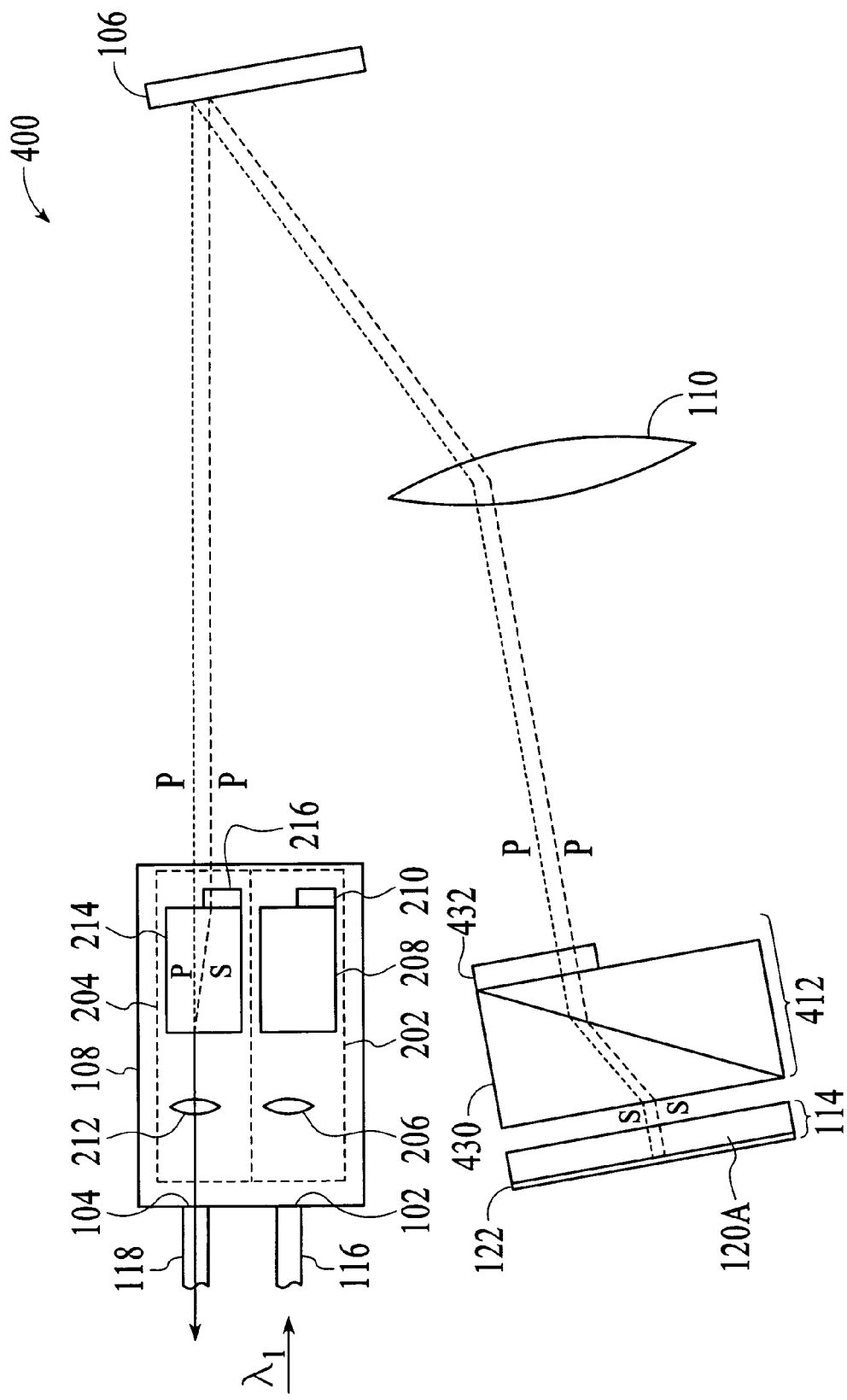
FIG. 4 is a side view of a wavelength selective switching device in accordance with a first alternative embodiment of the invention.

Turning now to FIG. 4, a wavelength selective switching device 400 in accordance with a first alternative embodiment of the invention is shown. In this embodiment, the wavelength selective switching device 400 includes an intermediate optical unit 412, which is composed of a Wollaston prism 430 and a half-wave plate 432 in a similar arrangement as the walk-off crystal 124 and the half-wave plate 126 of the intermediate optical unit 112 of the wavelength selective switching device 100. The Wollaston prism 430 is orientated such that the prism has a similar effect on S and P polarization components as the walk-off crystal 124.

In the incoming direction, the polarization components of an optical signal are in the P polarization state prior to reaching the intermediate optical unit 412. Thus, the polarization components are transmitted to the controllable switching array 114 without being affected by the Wollaston prism 430. The polarization components are then reflected back to the Wollaston prism 430 by the controllable switching array 114 in the S or P polarization state, depending on the optical state of a pixel, e.g., the pixel 120A, of the controllable switching array through which the polarization components propagated.

In the outgoing direction, if the wavelength of the polarization components is the selected wavelength, i.e., the polarization components are converted to S polarization components by the controllable switching array 114, the Wollaston prism 430 selectively displaces the S polarization components such that the polarization components are transmitted through the half-wave plate 432. By passing through the half-wave plate 432, the S polarization components are orthogonally rotated, converting the polarization components to P polarization components. These P polarization components are then transmitted to the output optical fiber 118 via the diffraction grating 106, as described above with respect to the wavelength selective switching device 100.

However, if the wavelength of the polarization components is not the selected wavelength, the polarization components are not converted to the S polarization components by the controllable switching array 114. Thus, in the outgoing direction, these polarization components are again not affected by the Wollaston prism 430, and thus, are not transmitted through the half-wave plate 432. Instead, the polarization components are transmitted back to the input optical fiber 116 via the diffraction grating 106, as described above with respect to the wavelength selective switching device 100.

Figure 5:
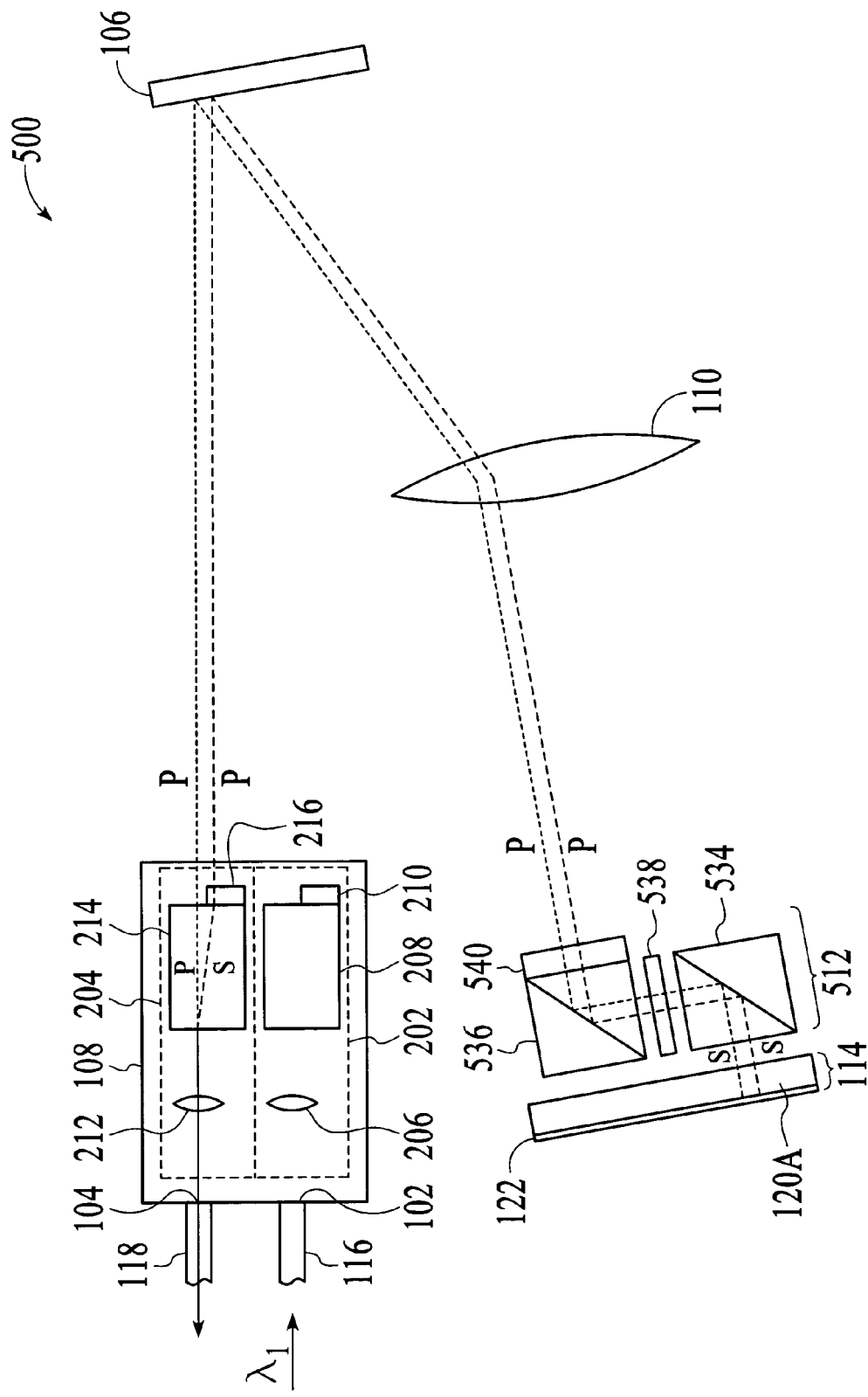
FIG. 5 is a side view of a wavelength selective switching device in accordance with a second alternative embodiment of the invention.

Turning now to FIG. 5, a wavelength selective switching device 500 in accordance with a second alternative embodiment of the invention is shown. In this embodiment, the wavelength selective switching device 500 includes an intermediate optical unit 512, which is comprised of polarizing beam splitters 534 and 536, an optional polarizer 538 and a half-wave plate 540. Similar to the intermediate optical units 112 and 412, in the outgoing direction, the intermediate optical unit 512 displaces and rotates the polarization components of a selected wavelength so that the polarization components are diffracted by the diffraction grating 106 in the P polarization state and transmitted to the output optical fiber 118.

The polarizing beamsplitter 534 is configured to reflect only S polarization components. In the illustrated embodiment, the polarizing beamsplitter 534 is orientated to reflect outgoing S polarization components toward the other polarizing beamsplitter 536. The polarizing beamsplitter 536 is also configured to reflect only S polarization components. The polarizing beamsplitter 536 is orientated to reflect the S polarization components from the polarizing beamsplitter 534 through the half-wave plate 540, where the S polarization components are orthogonally rotated, converting the polarization components to the P polarization state. The optional polarizer 538 is positioned between the two polarizing beamsplitters 534 and 536 to ensure that only the S polarization components from the polarizing beamsplitter 534 are transmitted to the polarizing beamsplitter 536.

In the incoming direction, the polarization components are in the P polarization state prior to reaching the intermediate optical unit 512. Thus, the polarization components are transmitted through the polarizing beamsplitter 534 to the controllable switching array 114. The polarization components are then reflected back to the polarizing beamsplitter 534 by the controllable switching array 114 in the S or P polarization state, depending on the activation state of a pixel, e.g., the pixel 120A, of the controllable switching array through which the polarization components propagated.

In the outgoing direction, the polarization components of a selected wavelength are reflected toward the polarizing beamsplitter 536 by the polarizing beamsplitter 534, since these polarization components are converted to S polarization components by the controllable switching array 114. The reflected S polarization components are transmitted through the optional polarizer 538 to the polarizing beamsplitter 536, where the polarization components are again reflected by the polarizing beamsplitter 536 toward the half-wave plate 540. At the half-wave plate 540, the S polarization components are converted to P polarization components. The converted P polarization components are then transmitted to the output optical fiber 118 via the diffraction grating 106, as described above with respect to the wavelength selective switching device 100.

However, if the wavelength of the polarization components is not the selected wavelength, the polarization components are not converted to the P polarization components by the controllable switching array 114. Thus, in the outgoing direction, these polarization components are not reflected by the polarizing beamsplitter 534 toward the polarizing beamsplitter 536, and consequently, are not transmitted through the half-wave plate 540. Instead, the polarization components are transmitted back to the input optical fiber 116 via the diffraction grating 106, as described above with respect to the wavelength selective switching device 100.

Figure 6:
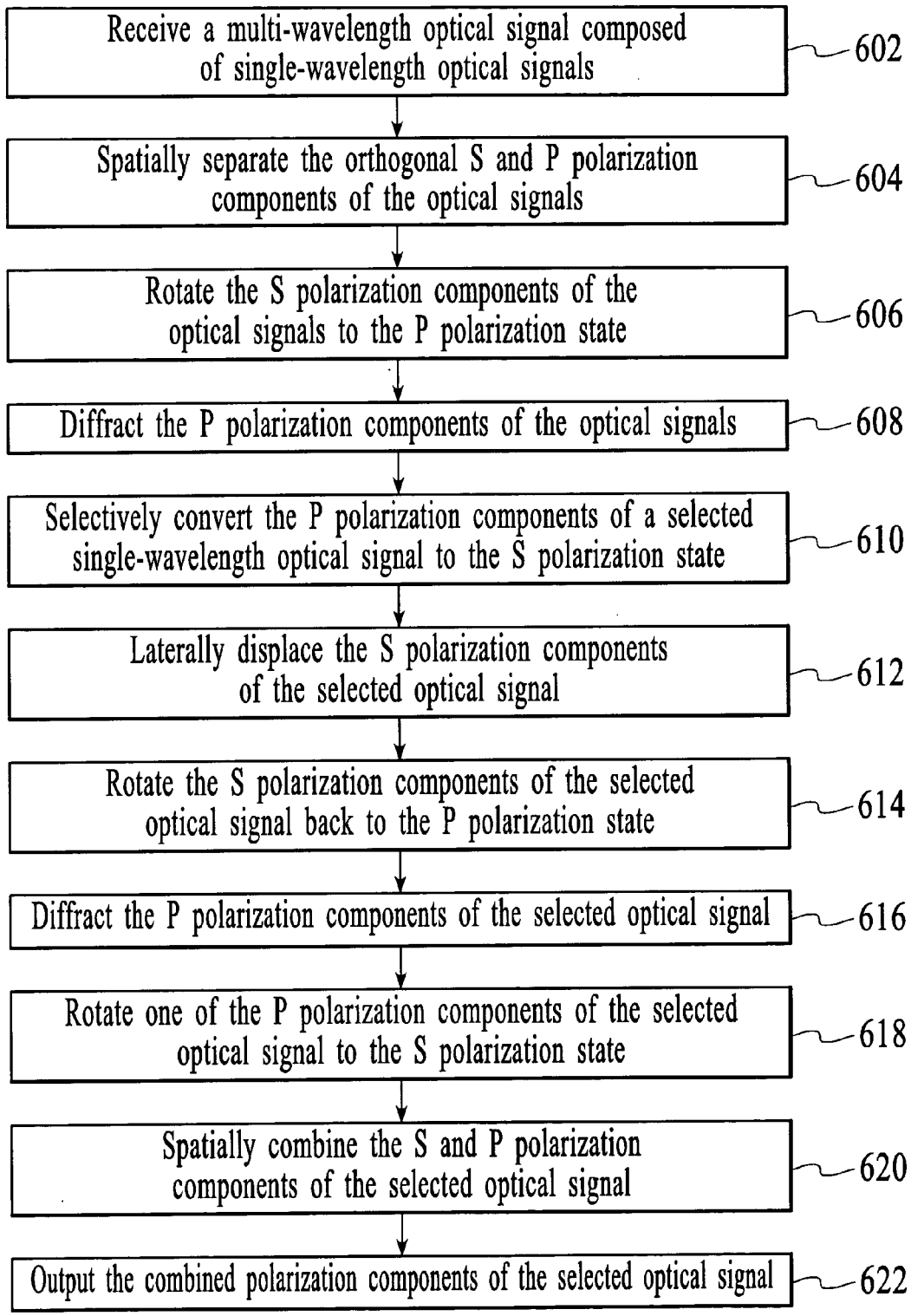
FIG. 6 is a flow diagram of a method for transmitting an optical signal of a selected wavelength in accordance with an embodiment of the invention.

A method for transmitting an optical signal of a selected wavelength in accordance with an embodiment of the invention is described with reference to the process flow diagram of FIG. 6. At block 602, a multi-wavelength optical signal composed of single-wavelength optical signals is received. At block 604, the orthogonal S and P polarization components of the single-wavelength optical signals are spatially separated. At block 606, the S polarization components of the single-wavelength optical signals are rotated to the P polarization state. At block 608, the P polarization components of the single-wavelength optical signals are diffracted to spatially separate the polarization components based on wavelength.

Next, at block 610, the P polarization components of a selected single-wavelength optical signal are converted to the S polarization state. At block 612, the S polarization components of the selected optical signal are laterally displaced. At block 614, the laterally displaced S polarization components are rotated back to the P polarization state. At block 616, the P polarization components of the selected optical signal are diffracted. At block 618, one of the P polarization components of the selected optical signal is rotated to the S polarization state. At block 620, the S and P polarization components of the selected optical signal are spatially combined. At block 622, the combined polarization components are output.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical device comprising:
    an optics system comprising an input to receive optical signals in an incoming direction and an output to selectively transmit a selected optical signal of said optical signals in an outgoing direction, said optics system being configured to selectively rotate one of the polarization components of each of said optical signals in said incoming direction to a first polarization state;
    an optical unit optically coupled to said optics system, said optical unit being configured to laterally displace and rotate said polarization components of said selected optical signal such that said polarization components of said selected optical signal in said outgoing direction are in said first polarization state, said optical unit comprising a Wollaston prism and a wave plate positioned such that said polarization components of said selected optical signal in said outgoing direction are selectively transmitted through said wave plate; and
    a diffraction grating positioned between said optics system and said optical unit to diffract said polarization components of said selected optical signal in said incoming and outgoing directions, said polarization components of said selected optical signal being in said first polarization state in both said incoming and outgoing directions at said diffraction grating.

2. The optical device of claim 1, wherein said diffraction grating has a grating line frequency greater than 900 grating lines per mm.

3. The optical device of claim 1, wherein said optical unit comprises a walk-off crystal and a wave plate positioned such that said polarization components of said selected optical signal in said outgoing direction are selectively transmitted through said wave plate.

4. The optical device of claim 1, further comprising a controllable switching array, said controllable switching array including pixels with changeable optical property.

5. The optical device of claim 4, wherein said pixels include electrically controllable birefringent material.

6. The optical device of claim 5, wherein said electrically controllable birefringent material is one of liquid crystal and lithium niobate.

7. An optical device comprising:
    an input optical unit comprising an input to receive optical signals, said input optical unit being configured to selectively rotate one of the polarization components of each of said optical signals to a first polarization state;
    an output optical unit comprising an output to selectively transmit said polarization components of a selected optical signal of said optical signals;
    a diffraction grating optically coupled to said input and output optical units to diffract said polarization components of said optical signals to and from said input and output optical units, said diffraction grating being a reflective type grating;
    an active optical element optically coupled to said diffraction grating, said active optical element being configurable to selectively convert said polarization components of said selected optical signal from said first polarization state to a second polarization state; and
    an intermediate optical unit positioned between said diffracting grating and said active optical element, said intermediate optical unit being configured to laterally displace and rotate said polarization components of said selected optical signal in an outgoing direction from said second polarization state to said first polarization state such that said polarization components of said selected optical signal are in said first polarization state at said diffraction grating in both said incoming and outgoing directions, said intermediate optical unit comprising a Wollaston prism and a wave plate positioned such that said polarization components of said selected optical signal in said outgoing direction are selectively transmitted through said wave plate.

8. The optical device of claim 7, wherein said diffraction grating has a grating line frequency greater than 900 grating lines per mm.

9. The optical device of claim 7, wherein said intermediate optical unit comprises a walk-off crystal and a wave plate positioned such that said polarization components of said selected optical signal in said outgoing direction are selectively transmitted through said wave plate.

10. The optical device of claim 7, wherein said intermediate optical unit comprises a polarizing beamsplitter and a wave plate positioned such that said polarization components of said selected optical signal in said outgoing direction are selectively transmitted through said wave plate.

11. The optical device of claim 7, wherein said active optical element comprises a controllable switching array, said controllable switching array including pixels with changeable optical property.

12. The optical device of claim 11, wherein said pixels comprises electrically controllable birefringent material.

13. The optical device of claim 12, wherein said electrically controllable birefringent material is one of liquid crystal and lithium niobate.

* * * * *